April 17, 1956 P. H. TAYLOR 2,742,333
SEAL FOR LIQUID SPRINGS
Filed April 21, 1953
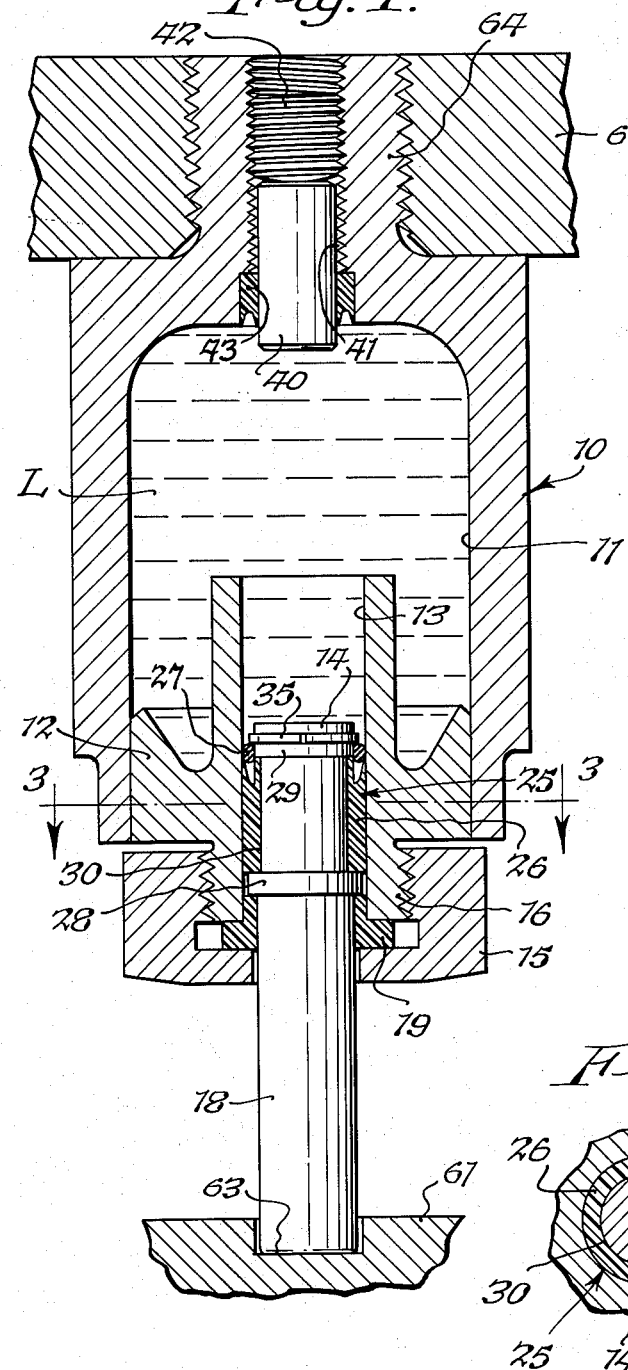
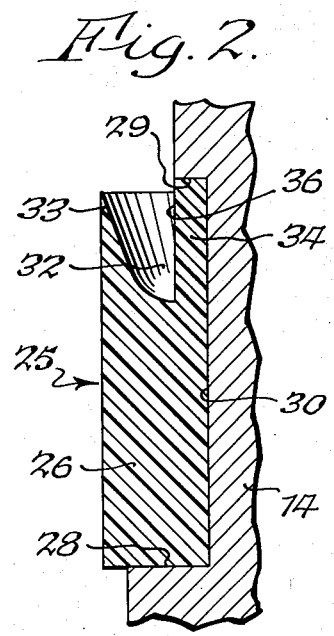
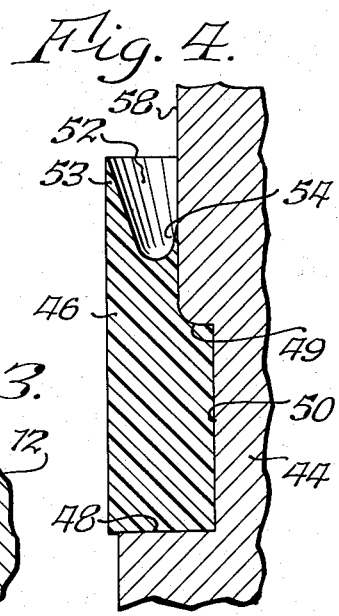
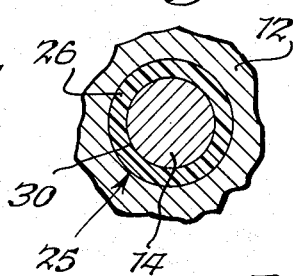
INVENTOR.
Paul H. Taylor
BY
Attorney.

United States Patent Office 2,742,333
Patented Apr. 17, 1956

2,742,333

SEAL FOR LIQUID SPRINGS

Paul H. Taylor, Grand Island, N. Y., assignor to Wales-Strippit Corporation, North Tonawanda, N. Y., a corporation of New York Application April 21, 1953, Serial No. 350,054

6 Claims. (Cl. 309—4)

The present invention relates generally to high pressure liquid seals and more particularly to a seal for use on a reciprocating part, such as a high pressure piston, to seal against leakage therealong, of liquid that may be subjected to extremely high pressure. In a still more specific aspect the invention relates to a seal suitable for use in liquid springs and like applications and more especially to a reciprocal seal which must be held to close tolerances and which is made of nylon or other light structural plastic material.

Seals have been a serious problem in most all high pressure liquid applications but they are particularly critical in liquid springs where the compressibility of a confined liquid is utilized to effect the desired resilient action. Here the seal must be reciprocal; it must be held to tolerances of the magnitude of .0002" or less; and it must have long life and reliability; otherwise the liquid spring will not be commercially satisfactory. In such a spring, a small body of liquid is employed, in some cases as little as two ounces. For instance, in one typical application to a small liquid spring, two ounces of liquid is compressible from 12 to 20% by volume at an operating pressure of as much as 50,000 lbs. per square inch by a piston having a diameter of one half inch at a stroke of say ¾". Obviously, in such an installation, the loss of a few cubic millimeters of liquid will reduce the operating load of the spring and render it inoperative for the purpose for which it is intended. It will be obvious, therefore, that for a liquid spring to be of any commercial value there must be provided in the spring a seal which is capable of sealing the liquid against all types of leakage for long periods of time, such as, for instance, a half million reciprocal strokes. This must be done not only under the tremendous pressures developed and despite the relative reciprocatory movement of the parts of the spring, but sometimes also under high operating temperatures and in hot corrosive atmospheres, etc. such as those to which conventional steel springs are subjected.

Conventional seals are wholly inadequate to the task of sealing liquid springs that have to be subjected to continuous use. As a consequence, heretofore liquid springs have only been used for aircraft landing gears and in similar installations. In such installations, the spring is subjected to only a few cycles over a long period of operation of the aircraft, because the landing gear is in operation only a small percentage of the time that the airplane itself is operable. In addition the spring is continuously serviced and checked for it is customary to service aircraft regularly after each flight, and the topping off or addition of fluid to an aircraft landing gear is therefore of little concern.

In a machine tool application, however, a punch press, for example, the liquid spring must be subjectable to continuous usage; and the life of the spring and its uniformity of operation are of paramount importance. Unless a liquid spring can run at least 150,000 cycles prior to any servicing or extended leakage, that spring would be of no possible commercial use, for instance, in diemaking or like fields.

The required liquid spring life can only be attained through use of a sealing medium, that will provide this extended life. Such a seal is disclosed in the pending U. S. patent application of Charles Lee Rovoldt, Serial No. 298,094, filed July 10, 1952 and now Patent No. 2,708,573, and assigned to the assignee of the present application.

As an example of some of the problems attendant upon the manufacture of such a seal, it will be apparent that the tolerance of the bore in which the seal operates and the tolerance of the seal itself must be extremely close. Heretofore, in order to provide proper mating of the parts, a slight press fit tolerance between seal and bore of approximately .001" has been used. This can vary between .001 down to .0006" interference, but must be held within that. It is obvious that to hone a bore closer than .0002" is a physical impossibility particularly when that bore must be held to a micro finish of 2 to 4 micro inch finish or better in order to eliminate excessive wear on the seal under the conditions under which it must operate. With this close finish tolerance on the bore it is further obvious that in order to avoid getting outside the allowable tolerances with respect to the interference of the seal, it is necessary that the seal tolerance itself as finished, including that of the steel shank of the piston which passes therethrough, must not exceed .0002". Since, as stated above the outer tolerance of the piston bore cannot be held closer than .0002", there has been no tolerance left for the plastic seal which must be manufactured, and since plastics are by their very nature flexible, variable and difficult to mold, the tolerances to date have had to be met by placing the seal after manufacture on the piston by a press fit, and then sizing the outside seal diameter to fit the tolerance of the bore. In this manner the interference tolerance between the bore and the nylon seal has been held. Obviously such a procedure of selective fits does not lend itself to a production setup and of necessity limits the sale of these springs because of the inability to mass produce them in the quantities required at a low enough cost.

One object of the present invention is to provide a seal for reciprocable pistons which under high pressures will have zero leakage.

Another object of this invention is to provide a high pressure seal for liquid springs, in which the loss due to the friction of the seal is negligible.

Another object of the invention is to provide a seal, for a reciprocating piston or plunger for sealing against leakage therealong of a high pressure liquid, which can be held to close dimensional tolerances.

Another object of the invention is to provide a seal of the character described that may be made of a resilient and compressible material having a fine finish.

Another object of this invention is to provide a seal of the character described which is accurate in configuration whereby effective sealing is realized.

Another object of this invention is to provide seals of the character described which can be closely controlled in manufacture.

Other objects of this invention will be apparent hereinafter from the description and from the recital of the appended claims.

In the drawings:

Fig. 1 is an axial section of a liquid spring constructed generally according to the copending application of George F. Wales, Serial No. 180,966 and now Patent No. 2,708,109, and equipped with a seal made according to the present invention;

Fig. 2 is an enlarged fragmentary section showing a portion of the piston or plunger of this spring and a portion of the seal;

Fig. 3 is a fragmentary section taken on the line 3—3 of Fig. 1, looking in the direction of the arrows; and Fig. 4 is a section, similar to Fig. 2, but showing a modified form of seal and piston.

Referring now to the drawings by numerals of reference, Fig. 1 discloses a liquid spring 10 of the type comprising a chamber 11, which is adapted to be filled with a compressible liquid L, such as silicone oil, and which is closed at one end and which has a piston-carrying head 12 welded or threaded into the other end thereof. The head 12 has a cylindrical bore 13 in which the piston 14 reciprocates. The piston 14 has a portion 18 projecting outwardly beyond the head 12. It is retained within the head by a nut 15 which threads onto a reduced portion 16 of the head and which holds in place a plastic, guide and seal 19. This seal has a flange portion seating against the outer face of the head 12 and fitting into the bore 13 of head 12 around piston 14. The seal 19 is adapted to engage the shoulder 28 of the piston to limit outward movement of the piston.

Mounted on the piston 14 is a seal denoted as a whole at 25. Basically this seal 25 comprises two elements designed to provide effective sealing at all the various stages of pressure of the liquid in the spring encountered in use. These stages of pressure may vary from zero or below, or some small initial preload, to the high loads, say from a p. s. i. of 1,000 initially to a maximum p. s. i. of 20,000 to to 50,000. The two sealing elements are, respectively, a dense, relatively rigid, plastic sleeve 26, which is distortable under medium pressures and compressible under high pressures to a limited degree, for purposes which are disclosed fully in the Rovoldt application above mentioned, and a soft, resilient, distortable, pressure-providing, annular member 27. The dense, relatively rigid sleeve 26 serves to seal the piston dynamically; and the soft, resilient annulus 27 acts both as a seal during the initial stroke of the piston and as a servo for actuating and holding the sealing sleeve 26 in sealing contact with the bore 13 of head 12 after the initial piston stroke. The annulus 27 may be, as shown, a conventional O-ring, such as is customarily used to seal pressures up to 3,000 p. s. i.

The piston 14 is formed with two axially-spaced shoulders 28 and 29, and between these shoulders is of reduced diameter providing an annular groove 30. Seal 26 is positioned in this groove.

Seal 26 is similar to the seal disclosed in the Rovoldt application, Serial No. 298,094 above mentioned being a generally-cylindrical, plastic sleeve made of nylon or the like, but seal 26, instead of being a machined seal, is molded into groove 30 of piston 18 to adhere thereto and it is retained therein by the shoulders 28 and 29. It has a V-shaped groove 32 at its inner end which is adapted to receive the O-ring 27. The O-ring, when positioned in the groove 32, forces the lip portion 33 (Fig. 2) at the outside of groove 32 into tight sealing contact with the bore 13 of head 12. In effect, then, all the resiliency of the soft rubber ring 27 is transmitted through the dense hard but resilient plastic material of lip 33 and sleeve 26 to effect sealing against leakage along piston 14 as it reciprocates in bore 13.

The O-ring 27 is positioned on the piston 14 initially around shoulder 29, and is initially retained thereon by a snap-ring 35. As the piston 14 is moved into the cylinder 11 the liquid L therein is, of course, compressed; and the compressed liquid, in turn, forces the O-ring 27 into the groove 32 in the sealing sleeve 25, forcing and holding the lip 33 of the sealing sleeve 25 into tight contact with the bore 13 of cap 12. Lip 33 has an inclined inner face bounding one side of groove 32, but inner lip 34 has an outside cylindrical surface 36 bounding the other side of the groove.

The shoulder 29 of the piston is of somewhat smaller diameter than shoulder 28 since shoulder 29 acts as a seat only for the inner lip 34 of the V-groove 32 of the seal 26, whereas shoulder 28 acts as a seat for the solid portion of the seal.

The liquid spring shown is, as previously stated, of the general configuration of that disclosed in the copending application of George F. Wales, Serial No. 180,966. In this spring a force adjuster or a means for compensating for load loss or load adjustment is employed shown herein generally at Fig. 1. This force adjuster, as disclosed more fully in copending application No. 180,966, comprises an adjustable piston member 40 that is adjustable axially in a hole 41 which is drilled in the upper end of container 11. Adjustment of piston 40 is effected by adjusting a screw 42 that threads into the upper end of spring 10. Adjustment of piston 40 varies the internal volume of the spring to change the force available from piston 14 by changing the enclosed volume of the chamber 11.

Force adjuster 40 is used either to adjust the load after the spring is in place or to compensate for any leakage which may occur beyond piston 14 during the life of the spring. Piston 40 operates in a seal 43 (Figs. 1 and 6) which may be similar to seal 25 except that in this essentially static application, it is a female type of seal. This seal may be the same as shown in Fig. 6 of the Rovoldt application above mentioned.

The spring 10 may be used between any two relatively movable parts whose relative movement it is desired to cushion or where it is desired to store energy on movement of one part toward the other under pressure to return the movable part to initial position when the pressure is released. It may be used where a mechanical spring, either a coil or a leaf spring, is employed. In the example shown it is mounted between two relatively movable parts 60 and 61, for instance, between the chassis and the axle of an automobile. The projecting end 18 of piston 14 is an engagement with part 61 seating in a groove 63 therein; and the container or housing 11 has a reduced stem portion 64 at its upper end which is threaded into the other part 60.

Fig. 4 shows a section of a modified form of seal 46 with a lip configuration identical to that of the seal shown in application Serial No. 298,094 above mentioned. The piston, here denoted at 44, has also a modified construction. In this embodiment of the invention the shoulders 48 and 49 of the piston are closer together than shoulders 28 and 29 of the first-described embodiment, making the peripheral groove 50 in the piston shorter, but still providing the keying between the piston and the seal which is essential to prevent stripping of the seal from the piston and which is required to insure that the seal and piston are in effect one part thereby eliminating any manufacturing tolerance between them.

In the seal of Fig. 4, a V-shaped groove is again provided at its inner end, but the inner lip 54 of this groove is shorter in length than its outer lip 53, although both lips have approximately the same angularity at their sides bounding groove 52. The V-shaped groove 52 is adapted to receive an O-ring similar to O-ring 27 and the outer sealing side 53 of the groove is slightly larger than the thickness of the cross-section of the sleeve 46 and tapers to a thin edge so as to be flexible. In the case of this seal the O-ring itself statically seals against the outside surface 58 of shoulder 49 of the piston; and it forces the lip 53 tight against the bore of the head 12 to seal against leakage along the piston as it reciprocates in the bore.

The main sealing member 26 or 46 is made of dense hard plastic material. Preferably it is made of one of the bearing nylons, such as FM 10001 and 3001, which are high strength structural nylons. This part can also be made, however, of high strength structural vinyls, the essential feature of the sleeve 26 or 46 being that it be made of a good bearing material having a low coefficient of friction, even though pressurizing the straight bore 13, and yet having long life and resiliency, and some compressibility to effect the necessary sealing.

One outstanding advantage of molding the sealing sleeve 26 or 46 on the piston 14 or 44 is the elimination of the tolerances between the sleeve and the piston shank which are necessary to maintain where the sleeve is made separately and then mounted on the piston shank. This makes its relatively easy to maintain the required .0002" tolerance on the outside of the sealing sleeve because there is no build-up in tolerance between the piston shank and the inside of the sleeve as has been the case heretofore with machined sealing sleeves.

Another advantage of the present invention is that it permits of elimination of the inner retaining means heretofore required for maintaining the sealing sleeve in position on the piston. The piston can now be made with an integral shoulder 29 or 49 for holding the seal in place; and by molding the seal on the piston in the groove between shoulders 28 and 29 or 48 and 49 the sealing sleeve is even more securely hold against axial movement relative to the piston than was heretofore possible.

A further feature of the present invention is that the seal 26 or 46 can be made thicker than heretofore. The sleeve no longer fits around the piston shank with a fit that is held as close as possible to a given tolerance. It is molded completely into the groove 23 or 50 and so can be of the maximum thickness permissible between the shank of the piston 14 and the bore 13 of the head in which the piston reciprocates. The greater thickness of the sleeve 26 or 46 permits greater flexibility and, moreover, the lip 33 or 53 can be made larger. Thereby greater control over manufacture of the seals is possible than has heretofore been the case.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. The combination with a piston which is adapted to reciprocate in a cylinder, of a seal on said piston and reciprocable therewith, said piston having two axially-spaced shoulders which are integral therewith and which together define a peripheral groove, one of said shoulders projecting radially outwardly further than the other of said shoulders, and said seal comprising a resilient, compressible material molded into said groove and filling the space between said shoulders and projecting radially of the piston beyond both said shoulders, said seal having a V-shaped groove at one end and adjacent said other shoulder, said V-shaped groove lying wholly radially outward of said other shoulder but having its major portion radially inward of said one shoulder.

2. The combination with a piston which is adapted to reciprocate in a cylinder, of a seal on said piston and reciprocable therewith, said piston having two axially-spaced shoulders which together define a peripheral groove, one of said shoulders projecting radially outwardly further than the other of said shoulders, and said seal comprising a cylindrical sleeve of resilient, compressible plastic molded into said groove and filling the space between said shoulders and projecting radially of the piston beyond both said shoulders, and having a generally V-shaped groove therein at the end thereof which is adjacent said other shoulder, said V-shaped groove being wholly radially outwardly of said other shoulder.

3. The combination with a piston which is adapted to reciprocate in a cylinder, of a seal on said piston and reciprocable therewith, said piston having two axially-spaced shoulders which together define a peripheral groove, and said seal comprising a cylindrical sleeve of resilient, compressible plastic molded into said groove and filling the space between said shoulders and projecting radially of the piston beyond said shoulders, and having a generally V-shaped groove therein at one end, the length of said seal externally of said groove being greater than the axial length of the first-named groove.

4. The combination with a piston which is adapted to reciprocate in a cylinder, of a seal on said piston and reciprocable therewith, said piston having two axially-spaced shoulders which together define a peripheral groove, one of said shoulders projecting radially outwardly further than the other of said shoulders, and said seal comprising a cylindrical sleeve of resilient, compressible plastic molded into said groove and filling the space between said shoulders and projecting radially of the piston beyond both said shoulders, and having a generally V-shaped groove therein at the end which is adjacent said other shoulder, the length of said seal externally of said groove being greater than the axial length of the first-named groove, and said V-shaped groove being formed in said seal wholly outside said other shoulder.

5. The combination with a piston which is adapted to reciprocate in a cylinder, of a seal on said piston and reciprocable therewith, said piston having two axially-spaced shoulders which together define a peripheral groove, one of said shoulders projecting radially outwardly further than the other of said shoulders, and said seal comprising a cylindrical sleeve of resilient, compressible plastic molded into said groove and completely filling the space between said shoulders and projecting radially of the piston beyond both of said shoulders, said seal being of greater axial length than said groove and having a V-shaped groove therein at the end thereof which is adjacent said other shoulder, said V-shaped groove being disposed axially and radially outside the first named groove and said other shoulder but having a major portion radially inwardly of said one shoulder.

6. The combination with a piston which is adapted to reciprocate in a cylinder, of a seal on said piston and reciprocable therewith, said piston having two axially-spaced shoulders which together define a peripheral groove, one of said shoulders projecting radially outwardly further than the other of said shoulders, and said seal comprising a cylindrical sleeve of resilient, compressible plastic molded into said groove and completely filling the space between said shoulders and projecting radially of the piston beyond both said shoulders, said seal being of greater axial length than said groove and having a V-shaped groove therein at the end thereof which is adjacent said other shoulder, said V-shaped groove being disposed axially and radially outside the first-named groove and said other shoulder but having a major portion radially inwardly of said one shoulder, the inside wall of said V-shaped groove being shorter than the outside wall thereof.

References Cited in the file of this patent

UNITED STATES PATENTS

| | | |
|---|---|---|
| Re. 19,000 | Scribner | Nov. 14, 1933 |
| 1,392,174 | Kempton | Sept. 27, 1921 |
| 1,808,047 | Littleton et al. | June 2, 1931 |
| 2,075,878 | Young | Apr. 6, 1937 |
| 2,127,290 | Farina | Aug. 16, 1938 |
| 2,140,733 | Carroll | Dec. 20, 1938 |
| 2,387,181 | Procter | Oct. 16, 1945 |
| 2,429,426 | Phillips et al. | Oct. 21, 1947 |
| 2,665,179 | Salvatora | Jan. 5, 1954 |
| 2,679,441 | Stillwagon | May 25, 1954 |

FOREIGN PATENTS

| | | |
|---|---|---|
| 105,053 | Great Britain | Mar. 21, 1917 |